United States Patent

Gore et al.

[11] Patent Number: 5,865,487
[45] Date of Patent: Feb. 2, 1999

[54] PICK-AND-PLACE TOOL FOR VACUUM AND MAGNETIC COUPLING

[75] Inventors: Kiron Gore, Libertyville; Charles Gray, Lombard, both of Ill.

[73] Assignee: Motorola, Inc., Schaumburg, Ill.

[21] Appl. No.: 652,734

[22] Filed: May 23, 1996

[51] Int. Cl.⁶ ................................................ B25J 15/06
[52] U.S. Cl. ................................. 294/2; 294/65; 294/65.5; 294/86.41
[58] Field of Search .................................. 294/2, 3, 64.1, 294/65, 65.5, 67.5, 81.6, 86.41; 414/606, 627, 737, 752; 901/40

[56] References Cited

U.S. PATENT DOCUMENTS

| | | | |
|---|---|---|---|
| 1,181,112 | 5/1916 | Charlebois | 294/2 |
| 1,792,576 | 2/1931 | Dyron | 294/81.6 X |
| 2,390,242 | 12/1945 | Engler | 294/65 |
| 3,033,381 | 5/1962 | Noble et al. | 294/65 X |
| 3,159,418 | 12/1964 | Jansen . | |
| 3,517,835 | 6/1970 | Temple . | |
| 4,121,865 | 10/1978 | Littwin, Sr. . | |
| 4,154,470 | 5/1979 | Dalglish | 294/86.41 X |
| 4,600,349 | 7/1986 | Vogt | 294/2 X |

FOREIGN PATENT DOCUMENTS

| | | | |
|---|---|---|---|
| 1272361 | 8/1961 | France | 294/65 |
| 2136781 | 2/1973 | Germany | 294/2 |
| 821378 | 4/1981 | U.S.S.R. | 294/2 |
| 1175851 | 8/1985 | U.S.S.R. | 294/65 |
| 1708606 | 1/1992 | U.S.S.R. | 294/2 |
| 845835 | 8/1960 | United Kingdom | 294/65 |

*Primary Examiner*—Johnny D. Cherry
*Attorney, Agent, or Firm*—John J. Oskorep

[57] ABSTRACT

A pick-and-place apparatus (404) for magnetically and vacuum coupling an item (1100) includes a base (516), a magnetic coupler (500), and a vacuum coupler (502). The magnetic coupler (500) includes a vertical member (506) and a magnetic body (504), where the vertical member (506) has a first end (501) coupled to a center (507) of the base (516) and a second end (503) coupled to the magnetic body (504). The vacuum coupler (502) includes a first tubular member (510), a first vacuum cup (508), a second tubular member (514), and a second vacuum cup (512). The first tubular member (510) has a first end (509) coupled to a first end (517) of the base (516) and a second end (511) having the first vacuum cup (508) attached thereto. The second tubular member (514) has a first end (513) coupled to a second end (519) of the base (516) and a second end (515) having the second vacuum cup (512) attached thereto. The vertical member (506) of the magnetic coupler (500) is retractable for decoupling a magnetically coupled item.

20 Claims, 9 Drawing Sheets

PICK-AND-PLACE TOOL FOR VACUUM AND MAGNETIC COUPLING

FIELD OF THE INVENTION

This invention relates generally to pick-and-place methods for packaging or assembling, and more particularly to pick-and-place methods used to pick-and-place items having a ferrous content.

BACKGROUND OF THE INVENTION

A product to be sold to a customer may include several items contained within a complete package. An item inside the complete package may itself have its own packaging. In a distribution center, items are often hand-picked and placed for packaging. Robotic methods used for packaging are also known, and typically involve a positioning system having an attached robotic arm for picking and placing the items.

Figure 1:
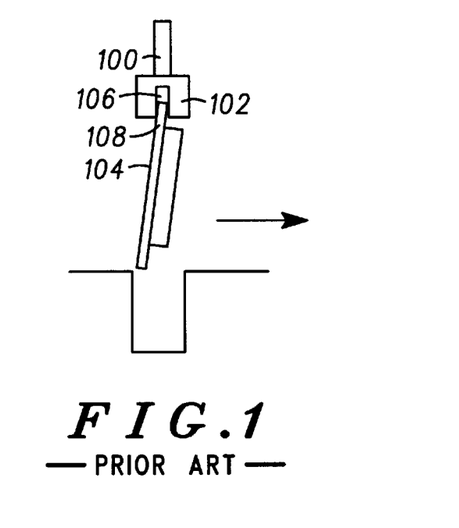
FIG. 1 shows a conventional pick-and-place apparatus utilizing a robotic arm having a gripping mechanism.

As shown in FIG. 1, a conventional pick-and-place apparatus may include a robotic arm 100 having a gripping mechanism 102 for picking and placing an item 104. Here, item 104 must be oriented in a vertical orientation for gripping mechanism 102 to grip item 104, since gripping mechanism 102 typically has a small gripping width 106. The vertical orientation required may result in pickup errors since a gripping area 108 of item 104 may be small and therefore difficult to grip accurately. In addition, when moving item 104 swiftly in a horizontal direction, item 104 may swing or sway, resulting in potential placement errors. If item 104 is moved more slowly to help eliminate this problem, efficiency of the pick-and-place method is reduced.

Figure 2:
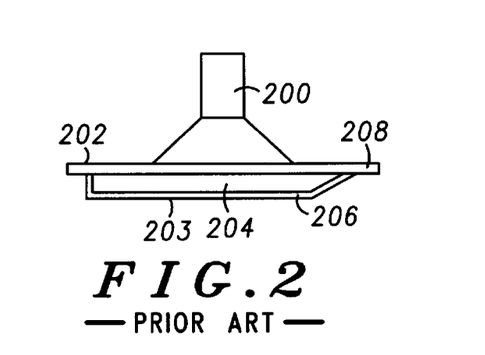
FIG. 2 shows a conventional pick-and-place apparatus utilizing a vacuum coupler.
Figure 3:
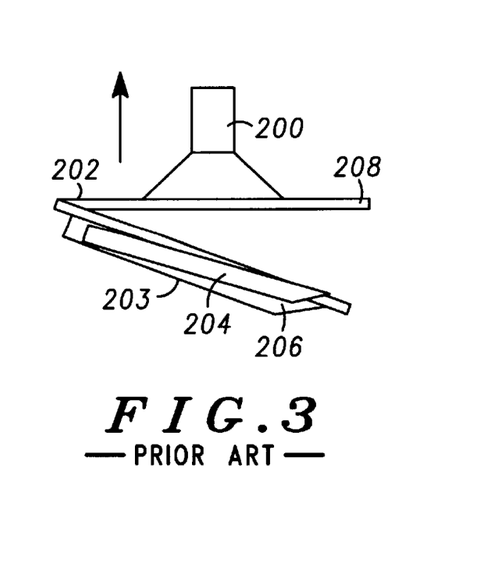
FIG. 3 shows the conventional pick-and-place apparatus utilizing a vacuum coupler, where an object within a package may inadvertently break open the package.

As shown in FIG. 2, a conventional vacuum pick-and-place apparatus may include a vacuum coupler 200 for picking and placing an item 202. Unfortunately, if item 202 consists of an object 204 within a package 203, where package 203 includes a main housing 206 and a cover 208, package 203 may undesirably open during pickup as shown in FIG. 3. Package 203 may open since vacuum coupler 200 picks up item 202 by cover 208 while the weight of object 204 rests on main housing 206. Package 203 may be sealed, but this adds an additional step to the packaging process, thereby increasing the required packaging time.

Conventional magnetic pick-and-place methods are known for picking and placing items having a ferrous content. However, as the speed of the pick-and-place method is increased, the required size of a permanent magnet to hold the item after pickup becomes quite large and impractical. A large magnet having a strong magnetic strength for pickup and fast positioning becomes a heavy drag on the positioning system and may further become an interference to other items or nearby electrical circuitry. In addition, a smaller item may be positioned inaccurately on a large magnet (since the large magnet may have a large magnetic surface) which may result in placement errors.

Combined vacuum and magnetic pick-and-place tools are known, but with these tools it may be difficult to pick and place items that are small, do not have planar surfaces, or require a high degree of placement accuracy. In addition, such conventional tools are inflexible to the varying shapes, sizes, and pickup needs of different items.

Accordingly, there is a resulting need for an accurate and efficient pick-and-place method and apparatus for picking and placing various items.

DETAILED DESCRIPTION OF THE PREFERRED EMBODIMENTS

According to the present invention, a pick-and-place apparatus for magnetically and vacuum coupling an item includes a base, a magnetic coupler, and a vacuum coupler. The magnetic coupler includes a vertical member and a magnetic body, where the vertical member has a first end coupled to a center of the base and a second end coupled to the magnetic body. The vacuum coupler includes a first tubular member, a first vacuum cup, a second tubular member, and a second vacuum cup. The first tubular member has a first end coupled to a first end of the base and a second end with the first vacuum cup attached thereto. The second tubular member has a first end coupled to a second end of the base and a second end with the second vacuum cup attached thereto. The vertical member of the magnetic coupler is retractable for magnetically decoupling the item from the pick-and-place apparatus.

Figure 4:
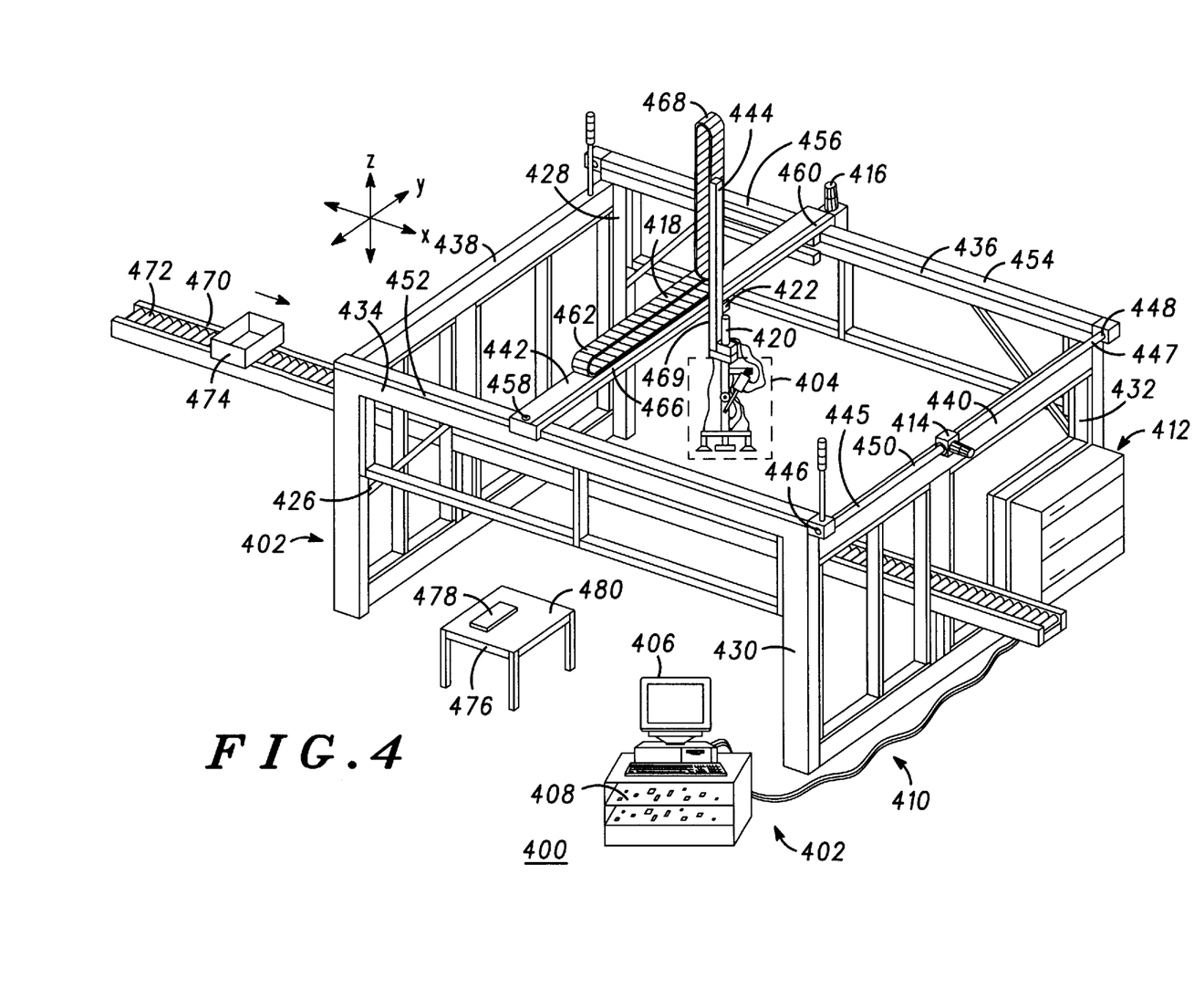
FIG. 4 shows a pick-and-place system which may embody the present invention.

FIG. 4 shows a pick-and-place system 400 which may embody the present invention. Pick-and-place system 400 comprises a positioning system 402 and a pick-and-place apparatus 404. Positioning system 402 includes a computer 406, electronic circuitry 408, electrical lines 410, amplifiers 412, and a positioning body 424. Positioning body 424 includes vertical members 426, 428, 430, 432, x-axis members 434, 436, y-axis members 438, 440, an x-moving member 442, a y-moving member 466, and a z-moving member 444. Positioning body 424 also includes motors 414, 416, 418, 420, positioning belts 452, 454, 464, 469, rod 450, and tracks 456, 462, 468.

Computer 406 is coupled to electronic circuitry 408, and electronic circuitry 408 is coupled to amplifiers 412 via electrical lines 410. Electrical cables (not visible) output from amplifiers 412 are disposed within and run upwards through vertical member 432. Some of the electrical cables run through y-axis member 440 to couple to motor 414. Some of the electrical cables run through x-axis member 436 and through track 456 to couple to motor 416. Some of the electrical cables run further through x-moving member 442 and through track 462 to couple to motor 418. Some of the electrical lines run further through y-moving member 466, through track 468, and through z-moving member 444 to couple to controllers 422 and motor 420.

Computer 406 contains a software program which controls pick-and-place system 400 to position and control pick-and-place apparatus 404. The software program also provides, for example, variability for speed and positioning of pick-and-place apparatus 404 on a product and item basis. Computer 406 generates data signals based on the software program, data signals which are sent to electronic circuitry 408. Electronic circuitry 408 accepts the data signals and translates them into signals that will control motors 414, 416, 418, 420 and controllers 422. To generate signals of sufficient strength for operating motors 414, 416, 418, 420, the signals are amplified by amplifiers 412.

Positioning body 424 is a structure for positioning pick-and-place apparatus 404. Vertical members 426, 428, 430, 432 vertically support x-axis members 434, 436 and y-axis members 438, 440. X-moving member 442 has a first end 458 and a second end 460. First end 458 rests on a track of x-axis member 434 and is attached to positioning belt 452, and second end 460 rests on a track of x-axis member 436 and is attached to positioning belt 454. X-axis member 434 includes a first end 446 and x-axis member 436 includes a first end 448. Rod 450 has a first end 445 and a second end 447 which are inserted through holes of first and second ends 446, 448, respectively. Motor 414 grips around a center of rod 450, such that when motor 414 is active, rod 450 rotates about the y-axis. Since positioning belt 452 wraps around first end 445 of rod 450 and positioning belt 454 wraps around second end 447 of rod 450, positioning belts 452, 454 move in the x-direction when rod 450 rotates via motor 414. Thus, x-moving member 442 (attached to positioning belts 452, 454) moves along x-axis members 434, 436, providing an x-directional movement for pick-and-place apparatus 404 when motor 414 is active.

A similar structure is provided for y-directional and z-directional movement. Y-moving member 466 is attached to a track of x-moving member 442 and positioning belt 464. Positioning belt 464 is coupled to motor 416 such that when motor 416 is active, positioning belt 464 moves in the y-direction. Thus, y-moving member 466 moves to provide y-directional movement for pick-and-place apparatus 404 when motor 416 is active. Z-moving member 444 is attached to a track of y-moving member 466 and positioning belt 469. Pick-and-place apparatus 404 is attached to positioning body 424 at z-moving member 444. Positioning belt 469 is coupled to motor 418 such that when motor 418 is active, positioning belt 469 moves in the z-direction. Thus, z-moving member 444 moves in the z-direction to provide z-directional movement for pick-and-place apparatus 404 when motor 418 is active. In addition, pick-and-place apparatus 404 is coupled to motor 420 such that when motor 420 is active, pick-and-place apparatus 404 rotates about the z-axis. In summary, positioning system 402 provides pick-and-place apparatus 404 with an x, y, z, and rotational movement.

In the embodiment shown in FIG. 4, pick-and-place system 400 is a system utilized for automated packaging. FIG. 4 shows an item 478 resting on a surface 480 of a picking area 476, and shows a box 474 resting on a plurality of automated rollers 472 of a packaging line 470. When box 474 is rolled via automated rollers 472 to an area closer to pick-and-place apparatus 404, pick-and-place system 400 picks up item 478 at picking area 476 and places item 478 into box 474. This task is typically controlled by the software program of computer 406, but may also be controlled manually by a user. Box 474 may contain smaller compartments for item 478 to rest within, thus requiring a high degree of placement accuracy for pick-and-place system 400.

Figure 5:
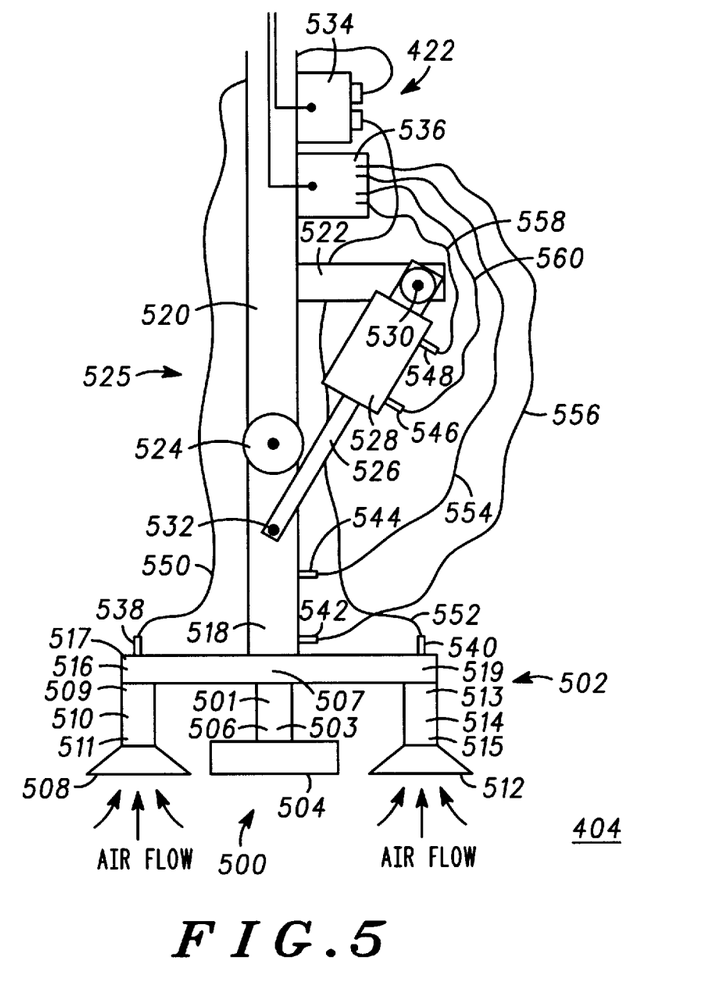
FIG. 5 shows a pick-and-place apparatus in accordance with the present invention.

FIG. 5 shows a pick-and-place apparatus 404 in accordance with the present invention. Pick-and-place apparatus 404 comprises a vertical member 518, a base 516, a magnetic coupler 500, and a vacuum coupler 502. Base 516 has a first end 517, a second end 519, and a center 507 where vertical member 518 is attached. Vacuum coupler 502 includes a tubular member 510, a vacuum cup 508, a tubular member 514, and a vacuum cup 512. Tubular member 510 has a first end 509 and a second end 511, where first end 509 is attached to first end 517 of base 516 and second end 511 is attached to vacuum cup 508. Tubular member 514 has a first end 513 and a second end 515, where first end 513 is attached to second end 519 of base 516 and second end 515 is attached to vacuum cup 512.

Figure 6:
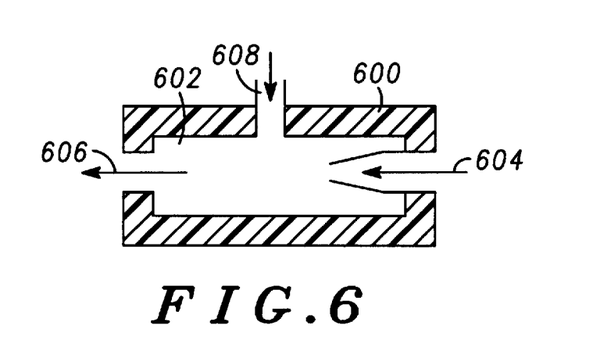
FIG. 6 is a cross-section of a Venturi system utilized for vacuum coupling.

FIG. 5 also shows controllers 422, which include a vacuum controller 534 and a pneumatic controller 536. Vacuum controller 534 provides a vacuum effect for vacuum coupler 502. Here, vacuum controller 534 is of a Venturi system type. A cross-sectional view of this type of system is shown in FIG. 6 for explanation. A body 600 includes a cavity 602, a first opening 604, a second opening 606, and a third opening 608. A vacuum effect is created in a Venturi system when compressed air is allowed to enter first opening 604 and cavity 602. This compressed air exits through second opening 606, thereby creating the vacuum effect at third opening 608.

Referring back to FIG. 5, vacuum controller 534 is coupled to electrical lines and controlled by electrical signals for turning on and off a vacuum effect for vacuum coupler 502. A valve 538 is coupled to first end 517 of base 516, and a valve 540 is coupled to second end 519 of base 516. A hose 550 attaches valve 538 to vacuum controller 534, and a hose 552 attaches valve 540 to vacuum controller 534. Base 516 and tubular members 510, 514 have hollowed areas such that air may be drawn in through first and second ends 511, 515 of tubular members 510, 514 and out through valves 538, 540, hoses 550, 552, and vacuum controller 534.

When vacuum controller 534 is controlled to generate the vacuum effect (vacuum coupler being "turned on"), an item may be vacuum coupled to vacuum cups 508, 512. Vacuum cups 508, 512 are typically made of a flexible material (e.g., rubber) and are provided to establish an air-tight seal between the item and vacuum coupler 502. Vacuum cups 508, 512 are small in size and only cover a limited surface area of an item. When vacuum controller 534 is controlled to stop the vacuum effect (vacuum coupler being "turned off"), the item may be vacuum decoupled from vacuum coupler 502.

Magnetic coupler 500 includes a vertical member 506 and a magnetic body 504. Vertical member 506 has a first end 501 coupled to center 507 of base 516 and a second end 503 having magnetic body 504 attached thereto. Magnetic body 504 is capable of magnetically coupling an item having a ferrous content. Magnetic body 504 may be a permanent magnet or an electromagnet. If magnetic body 504 is an electromagnet, magnetic body 504 is electrically coupled to the electrical cables and controlled by electrical signals from computer 406. For magnetically coupling the object, the electromagnet is "energized"; for magnetically decoupling the object, the electromagnet is "de-energized".

Figure 7:
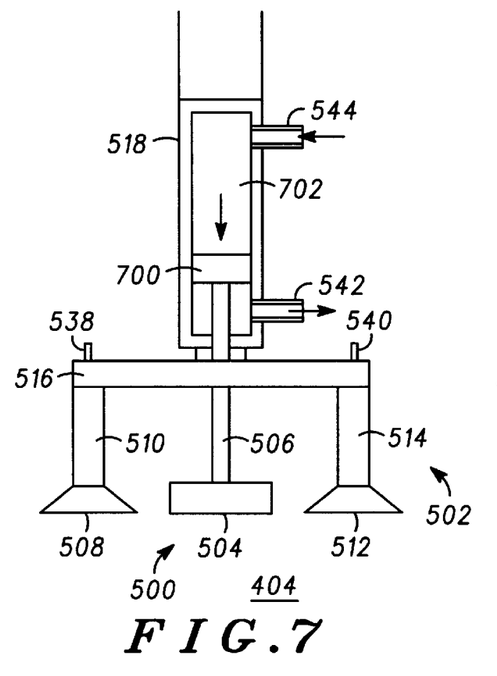
FIG. 7 shows the pick-and-place apparatus having a magnetic coupler in an extended position.
Figure 8:
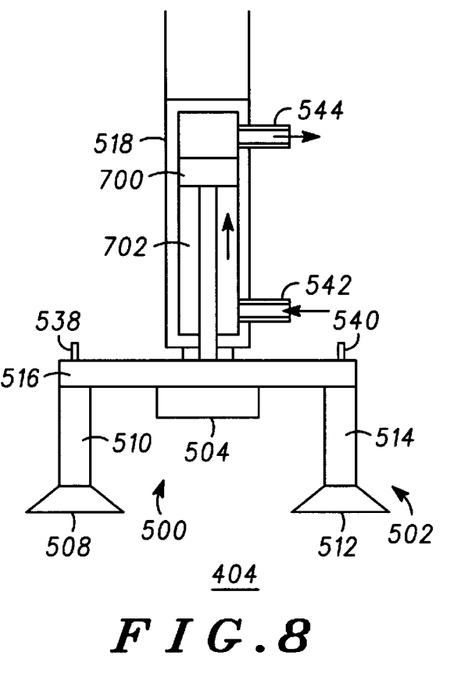
FIG. 8 shows the pick-and-place apparatus with the magnetic coupler in a retracted position.

In the preferred embodiment, magnetic body 504 is a permanent magnet and vertical member 506 is retractable. Vertical member 518 has a valve 542 and a valve 544. Valve 542 is attached to a hose 556, which is also attached to pneumatic controller 536. Valve 544 is attached to a hose 554, which is also attached to pneumatic controller 536. Pneumatic controller 536, like vacuum controller 534, is coupled to electrical lines and controlled by signals from computer 406 (FIG. 4). FIGS. 7 and 8 show the retractable nature of magnetic coupler 500. (Note that in FIGS. 7 and 8, and in the remaining figures, hoses 550, 552, 554, 556 and other elements are excluded for simplification.) More specifically, FIG. 7 shows magnetic coupler 500 in an extended position and FIG. 8 shows magnetic coupler 500 in a retracted position. Vertical member 518 includes an air cylinder 702 and a piston 700. Piston 700 is attached to vertical member 506. When magnetic coupler 500 is extended as shown in FIG. 7, compressed air from pneumatic controller 536 (FIG. 5) is injected through valve 544 and enters into air cylinder 702. The compressed air forces piston 700 to move downwards, and air is forced out of air cylinder 702 through valve 542. When magnetic coupler 500 is retracted as shown in FIG. 8, compressed air from pneumatic controller 536 (FIG. 5) is injected through valve 542 and enters into air cylinder 702. The compressed air forces piston 700 to move upwards, and air is forced out of air cylinder 702 through valve 544. This embodiment provides magnetic coupling of an item when magnetic coupler 500 is in the extended position (FIG. 7), and magnetic decoupling of the item when magnetic coupler 500 is in the retracted position (FIG. 8). The item is magnetically decoupled since vacuum coupler 502 maintains the item at a fixed distance away from magnetic coupler 500 upon its retraction.

Referring back to FIG. 5, tubular member 510, tubular member 514, and vertical member 506 are aligned on base 516 in a linear fashion. When magnetic coupler 500 is in the extended position, magnetic coupler 500 and vacuum coupler 502 extend from base 516 at lengths which are substantially the same. When an item is magnetically coupled to pick-and-place apparatus 404, and magnetic coupler 500 is moved from the extended position to the retracted position, physical forces from tubular members 510, 514 and vacuum cups 508, 512 on both ends of the item oppose magnetic forces on the item due to the retraction. Therefore, the item may be magnetically decoupled or dropped from pick-and-place apparatus 404 in a stable and balanced fashion. The present invention is not limited, however, to the linear fashion herein described. For example, it is conceived that pick-and-place apparatus 404 could include an additional base positioned perpendicular to base 516 and coupled to center 507. Here, the additional base would include two additional tubular members with vacuum cups and positioned in a similar linear fashion with magnetic coupler 500.

Figure 9:
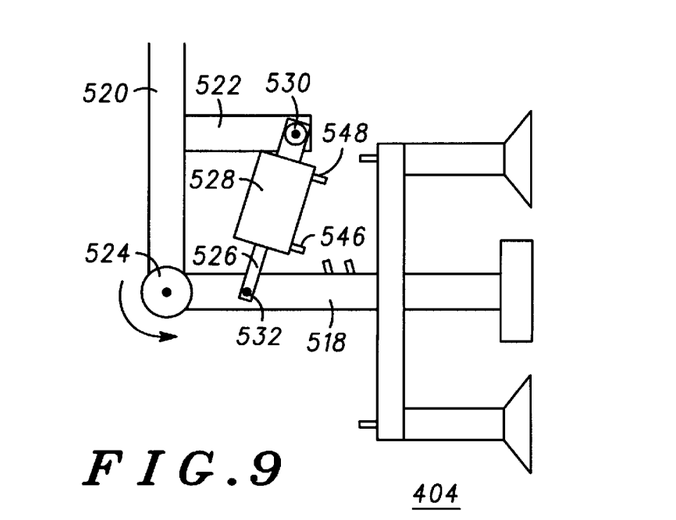
FIG. 9 shows the pick-and-place apparatus having an orientation device in a rotated position.

Pick-and-place apparatus 404 may also include an orientation device 525. Orientation device 525 includes a vertical member 520, a horizontal member 522, a hinge 524, and an orientation arm 526 including an air cylinder 528. Orientation arm 526 is attached to vertical member 518 via a pin 532, and also attached to horizontal member 522 via a pin 530. Valves 546, 548 are coupled to pneumatic controller 536 via hoses 560, 558, respectively. Orientation arm 526 is extended from and retracted into air cylinder 528 in the same manner that vertical member 506 of magnetic coupler 500 is extended and retracted in the preferred embodiment (FIGS. 7 and 8). Vertical member 520 and vertical member 518 are attached to hinge 524 such that vertical member 518 is perpendicularly rotated (see FIG. 9) when orientation arm 526 is pulled into air cylinder 528 via pneumatic controller 536 (FIG. 5). Thus, pick-and-place apparatus 404 provides a horizontal or vertical orientation for an item for picking and placing. In the preferred embodiment, orientation device 525 is designed such that the length of base 516 remains parallel to the ground upon rotation.

Figure 10:
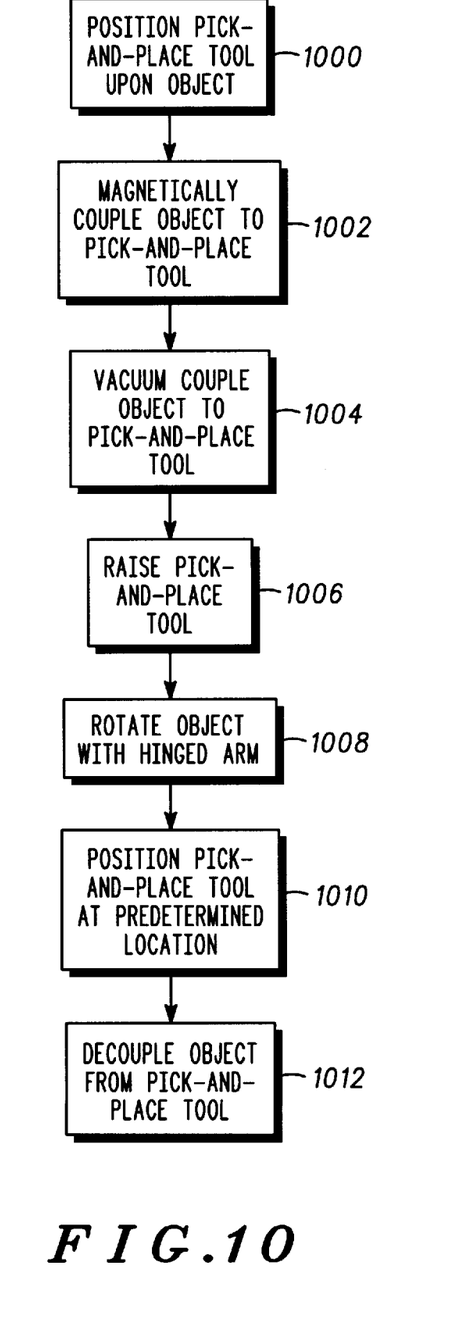
FIG. 10 is a flowchart of a method of picking and placing in accordance with the present invention.
Figure 11:
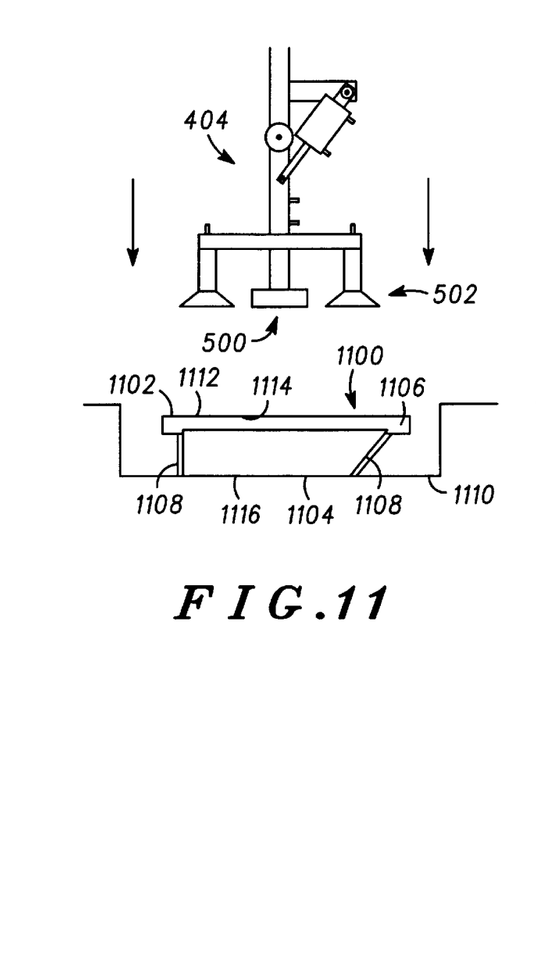
FIG. 11 shows the pick-and-place apparatus positioning downwards upon an item resting on a surface.

FIG. 10 shows a flowchart of a method picking-and-placing an item in accordance with the present invention. FIGS. 11 through 16 are referred to in conjunction with the flowchart steps of FIG. 10. FIG. 11 shows an item 1100 which includes a ferrous object 1104 enclosed within a package 1102. Item 1100 rests on a surface 1110. Package 1102 includes a cover 1106 (a first portion of package 1102) having a planar or flat surface, and a main housing 1108 (a second portion of package 1102). Cover 1106 has an outer face 1112 and an inner face 1114. Main housing 1108 has a bottom surface 1116. Cover 1106 may be attached to main housing 1108 by a hinge, and therefore may be capable of opening and closing about main housing 1108. Alternatively, cover 1106 and main housing 1108 may be entirely separate pieces, where cover 1106 is capable of attachment to and detachment from main housing 1108.

Figure 12:
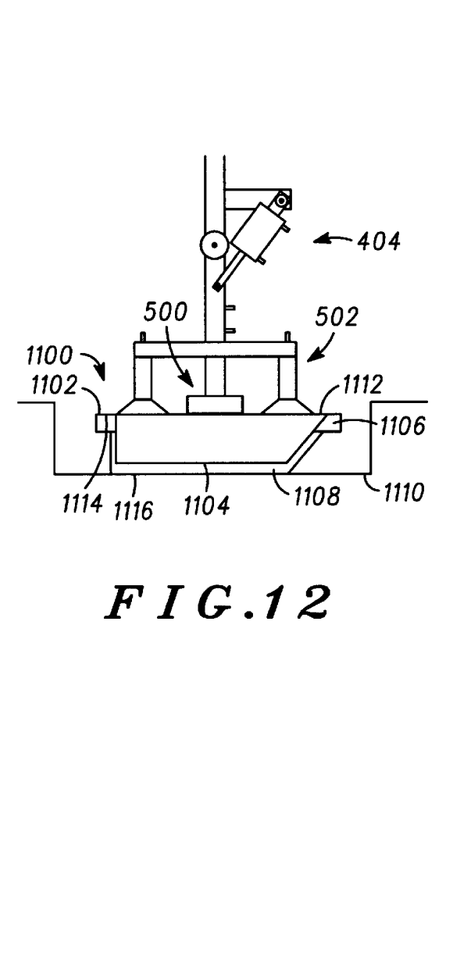
FIG. 12 shows the pick-and-place apparatus placed directly upon an outer face of the item, thereby magnetically and vacuum coupling the item.
Figure 13:
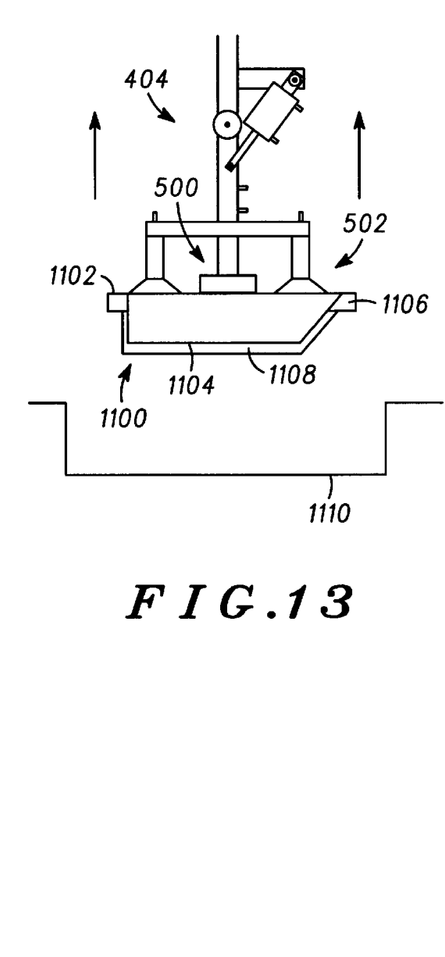
FIG. 13 shows the pick-and-place apparatus lifting the item from the surface.
Figure 14:
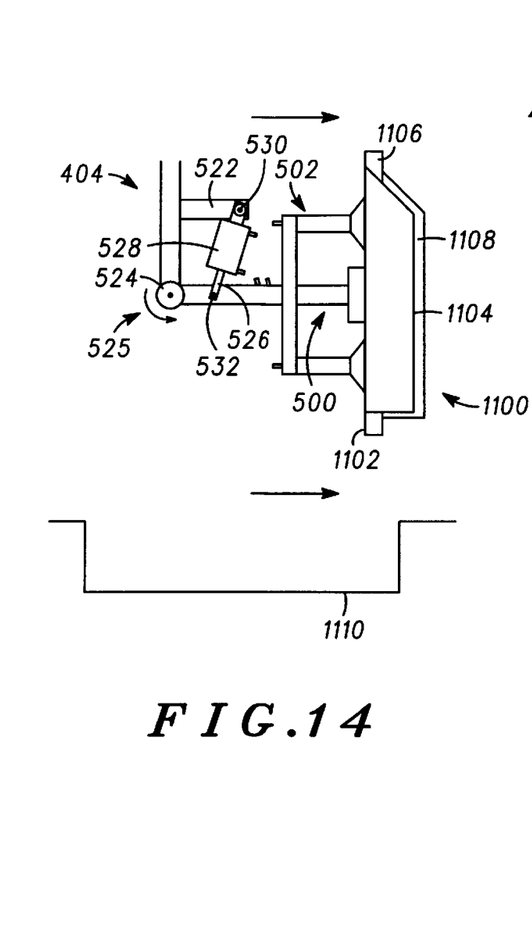
FIG. 14 shows the orientation device in the rotated position and transporting the item.

Referring back to FIG. 10, at step 1000, pick-and-place apparatus 404 is positioned downwards upon item 1100 for pickup (FIG. 11). At step 1002, when pick-and-place apparatus 404 is placed directly upon outer face 1112 of item 1100, item 1100 is magnetically coupled to pick-and-place apparatus 404 via magnetic coupler 500 (FIG. 12). Here, magnetic coupler 500 is in the extended position. Ferrous object 1104 is lifted within package 1102 (i.e. lifted from bottom surface 1116) due to the magnetic strength of magnetic body 504 and abutted to inner face 1114 of cover 1106. At step 1004, item 1100 is vacuum coupled to pick-and-place apparatus 404 via vacuum coupler 502 (also FIG. 12). At step 1006, pick-and-place apparatus 404 is raised to lift item 1100 from surface 1110 (FIG. 13). At step 1008, item 1100 is rotated at a predetermined angle by orientation device 525 (FIG. 14). Here, rotation is provided to position item 1100 in a vertical orientation. Since ferrous object 1104 is abutted to inner face 1114 via magnetic coupling, it is held securely within package 1102 during the orientation. At step 1010, pick-and-place apparatus 404 is moved and directed for positioning (also FIG. 14) at a predetermined location.

Figure 15:
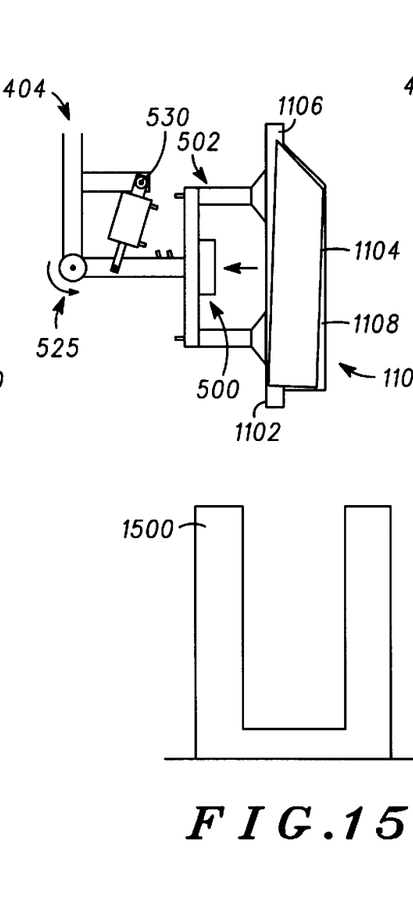
FIG. 15 shows the pick-and-place apparatus magnetically decoupling the item.
Figure 16:
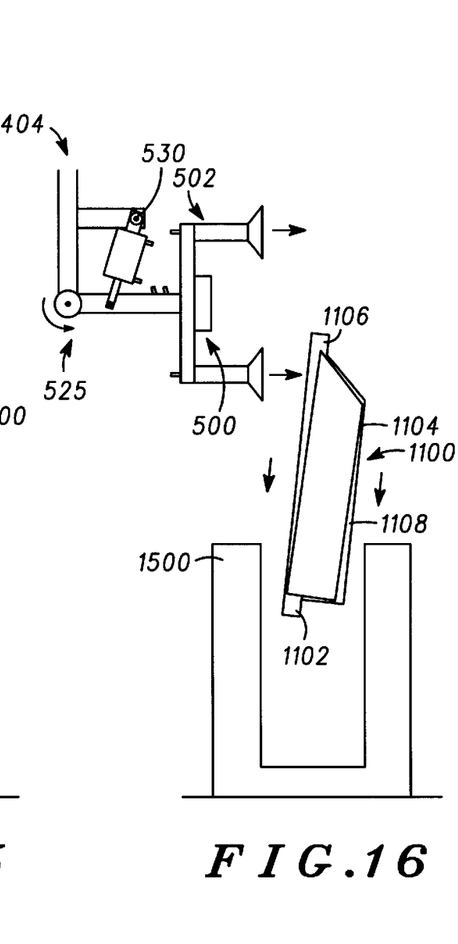
FIG. 16 shows the pick-and-place apparatus fully decoupling the item into a box compartment.

Since ferrous object 1104 is held by magnetic coupler 500, cover 1106 is less likely to open or detach from main housing 1108 during such lifting, rotating, or positioning. Ferrous object 1104 is less likely to break open package 1102. At step 1012, pick-and-place apparatus 404 decouples item 1100, placing it into a box compartment 1500 (FIGS. 15 and 16). FIG. 15 shows magnetic coupler 500 placed in the retracted position. The retraction of magnetic coupler 500 causes a magnetic decoupling of item 1100 from pick-and-place apparatus 404 since vacuum coupler 502 keeps item 1100 at a distance away from magnetic coupler 500 upon its retraction. FIG. 16 shows pick-and-place apparatus 404 vacuum decoupling item 1100 by shutting off vacuum coupler 502, where item 1100 is fully decoupled from pick-and-place apparatus 404 and placed in box compartment 1500. Vacuum coupler 502 may, in addition, decouple item 1100 by forcing air out of tubular members 510, 514 (FIG. 16).

The exact order in which the steps are taken may depend on the application. For example, cover 1106 of package 1102 may be made of a material that is easily deformable or non-rigid (e.g., package 1102 could be a plastic bag) such that vacuum coupling alone may cause cover 1106 to be undesirably suctioned within tubular members 510, 514 of vacuum coupler 502. Therefore, in this application, step 1002 should occur prior to step 1004. Here, magnetic coupling is provided first in order to magnetically couple ferrous object 1104 to inner face 1114 such that ferrous object 1104 planarizes (flattens) cover 1106. Thereafter, vacuum coupling of item 1100 is possible.

Simultaneously providing magnetic and vacuum coupling provides a very strong attachment of item 1100 to pick-and-place apparatus 404. Therefore, item 1100 may remain coupled to pick-and-place apparatus 404 at high speeds of positioning by positioning system 402 (FIG. 4), where the inertia of item 1100 becomes significant. Since magnetic coupling is provided, the weight of ferrous object 1104 does not cause package 1102 to break open during pick-and-place movements. In addition, items for which it is unnecessary or undesirable to magnetically couple may be picked and placed solely by vacuum coupler 502 of pick-and-place apparatus 404.

In the preferred embodiment, the permanent magnet used in magnetic coupler 500 has a magnetic strength roughly equivalent to (or not substantially greater than) the lifting strength required for initially magnetically lifting ferrous object 1104 when pick-and-place apparatus 404 is in a resting position upon outer face 1112 of item 1100 (see FIG. 12 and step 1002 of FIG. 10). The magnetic strength chosen in the preferred embodiment minimizes the size of the permanent magnet needed for pick-and-place apparatus 404, thus minimizing the drag on positioning body 424 and maximizing the efficiency of pick-and-place system 400. Vacuum coupler 502 needs only apply an added coupling force necessary to achieve a desired positioning speed or rotation of item 1100 (i.e. where the inertia of item 1100 does not cause it to be decoupled from pick-and-place apparatus 404 upon a quick positioning halt).

In one particular application, ferrous object 1104 is a battery used for a cellular telephone, and package 1102 is a thin, hardened-plastic packaging. Thus, item 1100 is a packaged battery. The pick-and-place system places the packaged battery in a small compartment of a box which includes a cellular telephone and electrical accessories. Attempting to achieve a positioning speed of about 1.6 meters per second with the packaged battery using a pick-and-place apparatus employing only a permanent magnet (i.e. having no other means of coupling), the permanent magnet must weigh about six pounds. Using the combined magnetic and vacuum coupling method in accordance with the present invention, a permanent magnet needs to only have a weight of about ¼ pound.

Figure 17:
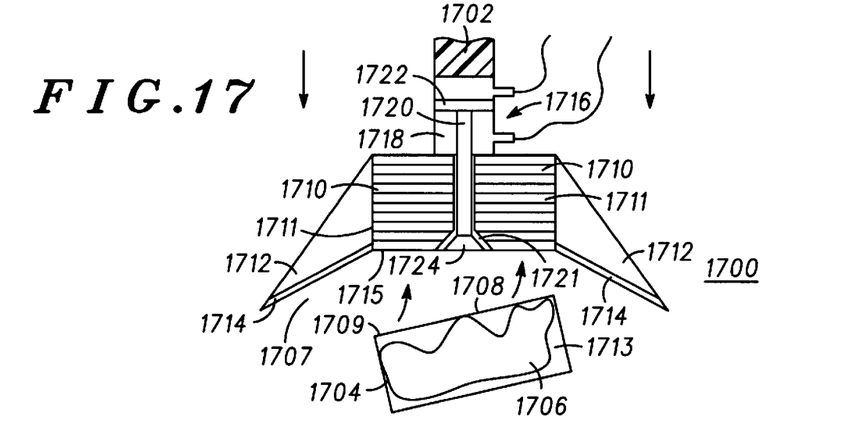
FIG. 17 shows an alternate embodiment of a pick-and-place apparatus in accordance with the present invention, positioning downwards upon an item.

FIG. 17 shows an alternate embodiment of a pick-and-place apparatus 1700 in a cross-sectional view. Pick-and-place apparatus 1700 is designed to pick-and-place an item 1704 having a ferrous content 1706. Here, item 1704 has a surface 1708, which is substantially planar or flat, and corners 1709, 1713. Item 1704 could be a package containing at least one ferrous object (e.g. a cardboard box containing metallic nails) or, alternatively, just a single ferrous object (e.g. a battery having a flat surface). Note that ferrous content 1706 may have a non-planar surface, making it difficult to vacuum couple ferrous content 1706 to a conventional pick-and-place apparatus without packaging.

Pick-and-place apparatus 1700 has a vertical member 1702, a central magnetic base 1710, a vacuum coupler 1716, and a guiding body 1712. Vertical member 1702 is coupled to central magnetic base 1710. Central magnetic base 1710 has a hole 1721 and an outer edge 1711 whereon guiding body 1712 is attached. Guiding body 1712 defines a cavity 1707 which inwardly tapers and is shaped to accept item 1704. Guiding body 1712 is preferably non-magnetic in character, and has a cavity surface 1714 that is made preferably from a material having a low frictional quality. In the preferred embodiment, cavity surface 1714 is made from a material called TEFLON™ or DELRON™. Vacuum coupler 1716 includes a vacuum cup 1724, an extending arm 1720, a piston 1722, and an air cylinder 1718. Vacuum coupler 1716 is disposed within hole 1721 and may extend and retract in the same manner as magnetic coupler 500, as discussed above (FIG. 7 and 8).

Figure 19:
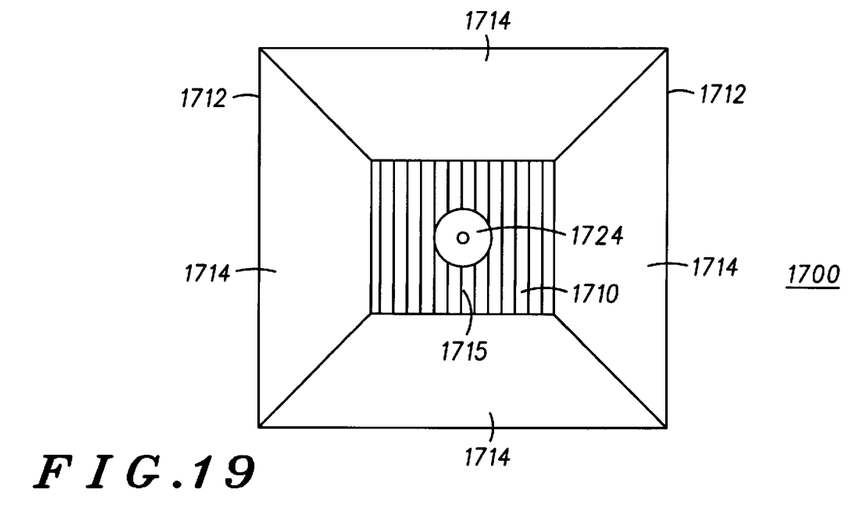
FIG. 19 shows a bottom view of the pick-and-place apparatus of FIGS. 17 and 18.

FIG. 19 shows a bottom view of pick-and-place apparatus 1700.

Figure 18:
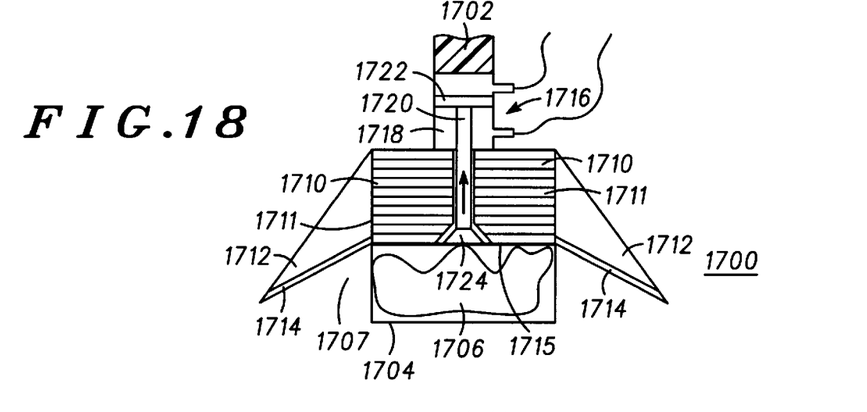
FIG. 18 shows the pick-and-place apparatus magnetically and vacuum coupling the item.

Referring back to FIG. 17, upon pickup, item 1704 may not be initially aligned properly with pick-and-place apparatus 1700. However, when surface 1708 and corners 1709, 1713 of item 1704 encounter cavity surface 1714 of guiding body 1712, surface 1708 and corners 1709, 1713 slide easily on cavity surface 1714, which guides item 1704 to a predetermined position on pick-and-place apparatus 1700 (e.g., in alignment with a surface 1715 of central magnetic base 1710). FIG. 18 shows item 1704 in a predetermined position on pick-and-place apparatus 1700 for this embodiment. Here, item 1704 is magnetically and vacuum coupled to pick-and-place apparatus 1700, where surface 1708 is substantially flush with surface 1715. Thus, item 1704 is positioned accurately on pick-and-place apparatus 1700, giving pick-and-place apparatus 1700 better accuracy for subsequently placing item 1704. Upon placing item 1704, vacuum coupler 1716 is turned off (i.e., no longer vacuum coupling item 1704) and positioned to an extended position. In the extended position, item 1704 is pushed far enough away from central magnetic base 1710 to magnetically decouple item 1704 from pick-and-place apparatus 1700. (Note that vacuum coupler 1716 may be left on during this decoupling if the combined magnetic and vacuum strength is necessary for full coupling.)

Another method may be employed where pick-and-place apparatus 1700 is first positioned above, but not touching, item 1704. Here, vacuum coupler 1716 is turned on, if not already on. To pick up item 1704, vacuum coupler 1716 is placed in the extended position and vacuum couples item 1704 to pick-and-place apparatus. Vacuum coupler 1716 is then retracted into cavity 1707 of central magnetic base 1710, where item 1704 is also magnetically coupled. During the retraction, item 1704 is positioned more accurately on pick-and-place apparatus 1700 due to guiding body 1712. With the combined and simultaneous coupling, transportation of item 1704 can be done at a high speed. Positioning vacuum coupler 1716 in the extended position magnetically decouples item 1704. Item 1704 is fully decoupled from pick-and-place apparatus 1700 when vacuum coupler 1716 is in the extended position and turned off. This method is advantageous if item 1704 is positioned or placed in a tightly confined area, or if central magnetic base 1710 may undesirably magnetically attract other items if positioned upon or too close to item 1704.

As shown in the varying embodiments, using a pick-and-place apparatus which has independently operating coupling devices (magnetic and vacuum) provides flexibility for picking and placing a variety of items located in or destined for varying locations.

Figure 20:
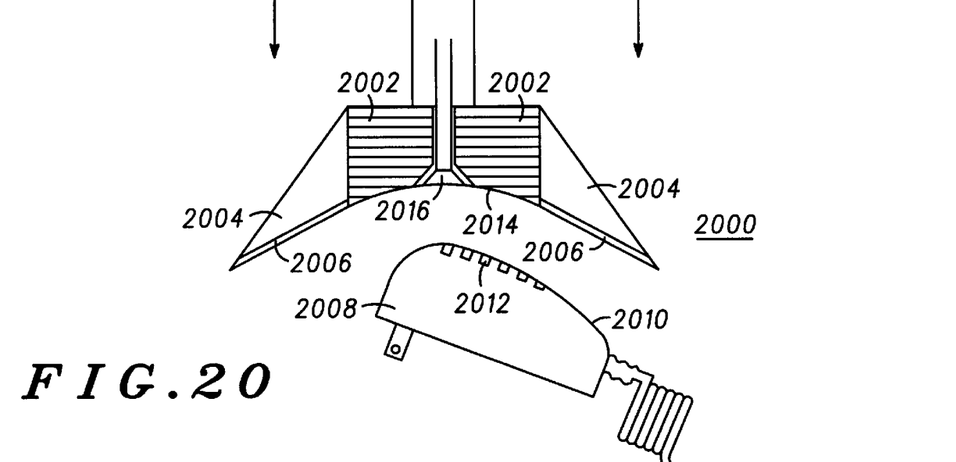
FIG. 20 shows another alternate embodiment of a pick-and-place apparatus in accordance with the present invention.

FIG. 20 shows another embodiment of a pick-and-place apparatus 2000 having a central magnetic base 2002 and a guiding body 2004 having a surface 2006. Pick-and-place apparatus 2000 is designed to pick-and-place an item 2008. Item 2008 has a top shape 2010 that is curved and includes ribs 2012. Given top shape 2010, item 2008 would be difficult to vacuum couple using a conventional vacuum coupler. However, given a bottom shape 2014 of central magnetic base 2002 which is similarly formed, item 2008 is more likely to be positioned as desired on pick-and-place apparatus 2000. A vacuum cup 2016 is therefore likely to be placed more precisely on item 2008 at a desired location for vacuum coupling.

Figure 21:
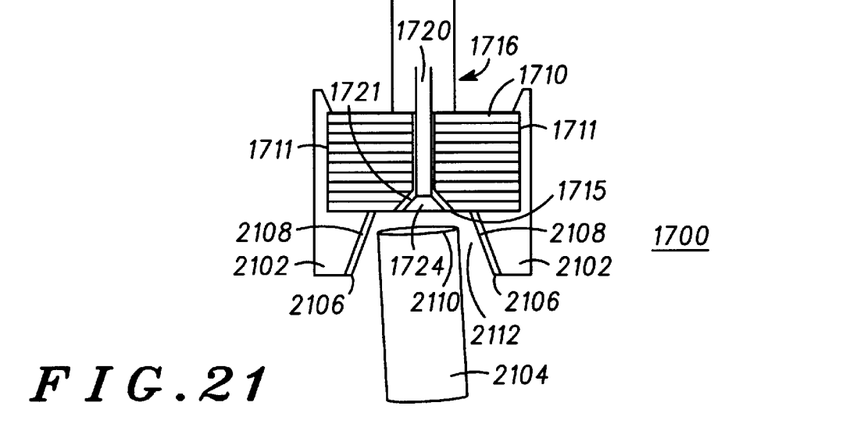
FIG. 21 shows the pick-and-place apparatus of FIG. 17 having an alternate guiding body for picking and placing a different item.
Figure 22:
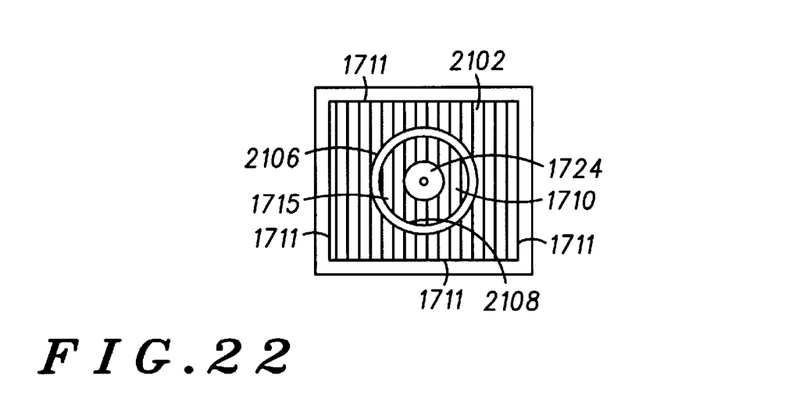
FIG. 22 shows a bottom view of the pick-and-place apparatus of FIG. 21.

Referring back to FIGS. 17 and 18, in the preferred embodiment, pick-and-place apparatus 1700 includes a central magnetic base 1710 that is a permanent magnet and a guiding body 1712 that is interchangeable with other guiding bodies. Each guiding body is pre-designed and shaped according to the item desired for pickup and placement. FIG. 21 shows a cross-sectional view of pick-and-place apparatus 1700 (shown previously in FIG. 17) with an alternate guiding body 2102 used to pickup an item 2104. A bottom view of pick-and-place apparatus 1700 with alternate guiding body 2102 is shown in FIG. 22. Dashed lines represent a portion of alternate guiding body 2102 covering surface 1715 of central magnetic base 1710. Since alternate guiding body 2102 covers a portion of surface 1715 of central magnetic base 1710, the magnetic force of that portion on item 2104 is substantially diminished.

Item 2104 has a top shape 2110 that is cylindrical. Alternate guiding body 2102 defines a cavity 2112 which is shaped to conform to top shape 2110 of item 2104 (albeit inwardly tapering for positioning guidance). More specifically, cavity 2112 is defined by an inner circumference 2108 and an outer circumference 2106, where inner circumference 2108 is smaller than outer circumference 2106. The outline and size of inner circumference 2108 is substantially equal to that of an outline of a surface of top shape 2110. Alternate guiding body 2102 is shaped like a cube on the outside, and has another cavity (as defined by outer edge 1711 of central magnetic base 1710) that is shaped to conform to central magnetic base 1710 for attaching thereto. It is conceived that a pick-and-place system may employ a method for automatically attaching and detaching different guiding bodies to and from pick-and-place apparatus 1700 for picking and placing different items.

While particular embodiments of the present invention have been shown and described, modifications may be made. It is therefore intended in the appended claims to cover all such changes and modifications which fall within the true spirit and scope of the invention.

What is claimed is:

1. A pick-and-place apparatus, comprising:
  a base having a first end and a second end;
  a vacuum coupler, said vacuum coupler including a first tubular member and a second tubular member, and a first vacuum cup and a second vacuum cup, said first tubular member having a first end and a second end, said first end of said first tubular member coupled near said first end of said base and said second end of said first tubular member having said first vacuum cup attached thereto, said second tubular member having a first end and a second end, said first end of said second tubular member coupled near said second end of said base and said second end of said second tubular member having said second vacuum cup attached thereto; and
  a magnetic coupler, said magnetic coupler including a vertical member and a permanent magnet, said vertical member having a first end and a second end, said first end of said vertical member movably coupled to said base and said second end of said vertical member having said permanent magnet attached thereto, said magnetic coupler being retractable and having an extended position and a retracted position operative for magnetically coupling and decoupling, respectively, an item from said pick-and-place apparatus.

2. The pick-and-place apparatus according to claim 1, further comprising:
  an orientation device coupled to said base, said orientation device operative to rotate said base at a predetermined angle.

3. A pick-and-place apparatus for picking and placing an item including a ferrous content and having a top shape, said pick-and-place apparatus comprising:
  a central magnetic base having a hole, a bottom shape, and an outer edge, said bottom shape shaped to conform substantially to said top shape of said item;
  a vacuum coupler including a vertical member and a vacuum cup, said vertical member inserted through said hole of said central magnetic base, said vacuum coupler capable of being positioned in a retracted position and an extended position, said vacuum coupler substantially disposed within said hole when said vacuum coupler is in the retracted position, said vacuum cup positioned outside of said hole when said vacuum coupler is in the extended position; and
  a guiding body attached to said outer edge of said central magnetic base, said guiding body inwardly tapering for guiding and positioning said item accurately to said central magnetic base and said vacuum coupler.

4. The pick-and-place apparatus of claim 3 wherein said guiding body is made of a material which is non-magnetic, and wherein said guiding body has a surface which has a low frictional quality.

5. A pick-and-place apparatus for picking and placing a first item having a ferrous content, said first item having a first top shape, said pick-and-place apparatus comprising:
  a central magnetic base having a hole and an outer edge;
  a vacuum coupler including a vertical member and a vacuum cup, said vertical member inserted through said hole of said central magnetic base, said vacuum coupler capable of being positioned in a retracted position and an extended position, said vacuum coupler substantially disposed within said hole when said vacuum coupler is in the retracted position, said vacuum cup positioned outside of said hole when said vacuum coupler is in the extended position; and a first guiding body defining a first cavity, said first guiding body attached to said outer edge of said central magnetic base, said first cavity shaped to conform substantially to said first top shape of said first item and tapering inwardly, said first guiding body for guiding and positioning said first item accurately to said central magnetic base and said vacuum coupler.

6. The pick-and-place apparatus of claim 5 wherein said first guiding body is attachable to and detachable from said central magnetic base, said pick-and-place apparatus is also used for picking and placing a second item having a second top shape, said pick-and-place apparatus further comprising:

a second guiding body defining a second cavity, said second guiding body being attachable to and detachable from said central magnetic base, said second cavity shaped to confrom substantially to said second top shape of said second item and tapering inwardly, said second guiding body for guiding and positioning said second item accurately to said central magnetic base and said vacuum coupler.

7. A pick-and-place tool, comprising:

a base;

a first vacuum cup, said first vacuum cup carried with said base;

a permanent magnet, said permanent magnet carried with said base and disposed outside of said first vacuum cup; and a movable member, said movable member movably connected to said base and connected to one of said said permanent magnet and said first vacuum cup, said movable member operative to move to a first position where a first vacuum pick-up area of said first vacuum cup is substantially coplanar with at least a portion of a magnetic pick-up area of said permanent magnet, said movable member operative to move to a second position where the first vacuum pick-up area is substantially noncoplanar with the at least a portion of the magnetic pick-up area and located further away from said base than the at least a portion of the magnet pick-up area, said movable member operative to move from the first position such that no substantial movement of said first vacuum cup occurs in a direction parallel to the first vacuum pick-up area.

8. The pick-and-place tool according to claim 7, wherein said movable member is connected to said permanent magnet.

9. The pick-and-place tool according to claim 7, wherein said movable member is connected to said permanent magnet and is operative to retract said permanent magnet toward said base to the second position.

10. The pick-and-place tool according to claim 7, wherein said movable member is connected to said permanent magnetic and is operative to retract said permanent magnet toward said base to the second position in a direction substantially perpendicular to the first vacuum cup area.

11. The pick-and-place tool according to claim 7, further comprising:

a second vacuum cup, said second vacuum cup carried with said base; and wherein said movable member is connected to said permanent magnet, said movable magnet operative to move to the first position where a second vacuum pick-up area of said second vacuum cup is substantially coplanar with the at least a portion of the magnetic pick-up area, said movable member operative to move to the second position where the second vacuum pick-up area is substantially noncoplanar with the at least a portion of the magnetic pick-up area and located further away from said base than the at least a portion of the magnet pick-up area, said movable member operative to move from the first position such that no substantial movement of said second vacuum cup occurs in a direction parallel to the second vacuum pick-up area.

12. The pick-and-place tool according to claim 11, wherein said first vacuum cup, said permanent magnet, and said second vacuum cup are positioned in a linear fashion on said base in the first position.

13. The pick-and-place tool according to claim 7, wherein said movable member is connected to said first vacuum cup.

14. The pick-and-place tool according to claim 13, further comprising:

a guiding body, said guiding body carried with said base and surrounding at least a portion of said permanent magnet.

15. The pick-and-place tool according to claim 7, wherein said movable member is connected to said first vacuum cup and is operative to extend said first vacuum cup away from said base to the second position.

16. The pick-and-place tool according to claim 7, wherein said movable member is connected to said first vacuum cup and is operative to extend said first vacuum cup away from said base to the second position in a direction substantially perpendicular to the first vacuum cup area.

17. The pick-and-place tool according to claim 7, wherein said movable member is disposed in a hole substantially in a center of the magnetic pick-up area.

18. The pick-and-place tool according to claim 7, wherein said movable member is operative to magnetically decouple an item from said permanent magnet when positioned from the first position to the second position.

19. The pick-and-place tool according to claim 7, further comprising:

an orientation arm, said orientation arm connected to said base and operative to rotatably position said base in a first position and a second position.

20. The pick-and-place tool according to claim 7, further comprising:

a first member;

a second member, said second member connected to said base;

a hinge, said hinge connecting said first and said second members; and an orientation arm, said orientation arm connected to said base and operative to rotatably position said base in a first position and a second position.

* * * * *